United States Patent [19]

Watanabe et al.

[11] Patent Number: 5,617,228

[45] Date of Patent: Apr. 1, 1997

[54] POLYMER-DISPERSED LIQUID CRYSTAL DISPLAY DEVICE AND METHOD TO SET LIQUID CRYSTAL LAYER THICKNESS IN ASSOCIATION WITH DRIVING VOLTAGE

[75] Inventors: Yoshihiro Watanabe, Yokohama; Hiroki Nakamura, Chigasaki, both of Japan

[73] Assignee: Kabushiki Kaisha Toshiba, Kanagawa-ken, Japan

[21] Appl. No.: 471,463

[22] Filed: Jun. 6, 1995

[30] Foreign Application Priority Data

Jul. 13, 1994 [JP] Japan .................................. 6-161387

[51] Int. Cl.⁶ .......................... G02F 1/133; G02F 1/1333
[52] U.S. Cl. .................... 349/19; 349/86; 349/92
[58] Field of Search ........................ 359/51, 52

[56] References Cited

U.S. PATENT DOCUMENTS

| | | | |
|---|---|---|---|
| 4,435,047 | 3/1984 | Fergason | 350/347 |
| 4,688,900 | 8/1987 | Doane et al. | 350/347 |
| 5,469,278 | 11/1995 | Takahara | 359/51 |
| 5,519,519 | 5/1996 | Hideaki et al. | 359/51 |

FOREIGN PATENT DOCUMENTS 6-027450  2/1994  Japan ........................ 359/51

*Primary Examiner*—Anita Pellman Gross
*Assistant Examiner*—Julie-Huyen Ngo
*Attorney, Agent, or Firm*—Finnegan, Henderson, Farabow, Garrett & Dunner, L.L.P.

[57] ABSTRACT

When two substrates for a polymer-dispersed liquid crystal display panel are joined with a polymer-dispersed liquid crystal layer therebetween, a substrate supporting stage of a substrate joining machine is controlled to keep the uniformity in the screen of a space between the two substrates at a visually satisfactorily uniform level, thereby enabling to produce a liquid crystal display device provided with a polymer-dispersed liquid crystal layer having high uniformity in the screen. The above stage is preferably a transparent plate such as a quartz substrate. The transparent plate is used to uniformly and effectively irradiate the liquid crystal layer with ultraviolet rays to cure the liquid crystal layer by photo-setting. Besides, the two substrates having the polymer-dispersed liquid crystal layer therebetween are irradiated with light, interference fringes formed are observed, and a liquid crystal layer thickness value and the unevenness of the liquid crystal layer thickness can be detected based on the unbalance of a plane distribution and a density of the interference fringes. Based on the detected liquid crystal layer thickness value and unevenness of the liquid crystal layer thickness, the position and pressure of the supporting stage can be controlled to suppress the unevenness of the liquid crystal layer thickness and the variation of the pressure in the display screen to a level which does not effect on the reduction in display quality.

9 Claims, 11 Drawing Sheets

FIG. 3

| SAMPLE NO. | a | b | c | d |
|---|---|---|---|---|
| MAXIMUM | 14.28 | 14.35 | 14.29 | 14.41 |
| MINIMUM | 14.14 | 14.22 | 14.18 | 14.26 |
| AVERAGE | 14.20 | 14.25 | 14.25 | 14.30 |

FIG. 5A

| | | |
|---|---|---|
| +0.03 | +0.02 | −0.03 |
| +0.08 | −0.04 | −0.03 |
| +0.05 | −0.02 | −0.06 |

| | | |
|---|---|---|
| −1.4 | −1.2 | −1.3 |
| −2.9 | 0 | +0.1 |
| −2.6 | −0.8 | +0.5 |

| SAMPLE NO. | e | f | g | h |
|---|---|---|---|---|
| MAXIMUM | 14.53 | 14.59 | 14.50 | 14.49 |
| MINIMUM | 13.94 | 14.25 | 14.05 | 13.82 |
| AVERAGE | 14.22 | 14.28 | 14.25 | 14.30 |

FIG. 7A

| | | |
|---|---|---|
| −0.28 | +0.01 | +0.12 |
| −0.14 | −0.04 | +0.22 |
| −0.11 | −0.07 | +0.31 |

| | | |
|---|---|---|
| +6.5 | +0.6 | −5.3 |
| +1.4 | 0 | +7.0 |
| +1.6 | +1.1 | +9.9 |

| SAMPLE NO. | e | f | g | h |
|---|---|---|---|---|
| MAXIMUM | 6.92 | 6.98 | 6.88 | 7.02 |
| MINIMUM | 6.49 | 6.53 | 6.32 | 6.61 |
| AVERAGE | 6.75 | 6.82 | 6.79 | 6.85 |

FIG. 9A

| +0.12 | −0.21 | +0.10 |
|---|---|---|
| −0.26 | +0.14 | +0.13 |
| +0.17 | −0.03 | −0.16 |

| +0.1 | +3.1 | +2.0 |
|---|---|---|
| +4.1 | 0 | +0.1 |
| −0.2 | +1.5 | +2.7 |

[%]

5,617,228

POLYMER-DISPERSED LIQUID CRYSTAL DISPLAY DEVICE AND METHOD TO SET LIQUID CRYSTAL LAYER THICKNESS IN ASSOCIATION WITH DRIVING VOLTAGE

BACKGROUND OF THE INVENTION

1. Field of the Invention

This invention relates to a polymer-dispersed liquid crystal display device and a method for production thereof.

2. Description of the Related Art

Liquid crystal display devices and plasma emitting display devices are attracting attentions as flat panel display devices which are lighter and smaller than the CRT display device. These display devices can be roughly divided into two types, namely a self-emissive type which emits light on its own to display and a non-emissive type, or transmission controlling type, which has a separate light source and controls the transmission of light to display.

A typical one among the transmission controlling type display devices is a liquid crystal display device which is becoming commercially practical extensively in various fields as the most likely next generation of the display devices.

There will be described a fundamental concept of a projection display apparatus.

FIG. 13 shows the arrangement of the projection display apparatus. The projection display apparatus comprises an optical system having a spheroidal mirror 101, a light source lamp 102, a collimator lens 103, an electric aperture stop 104, a scattering type liquid crystal panel 105, a field lens 106, projection lenses 107, and another electric aperture stop 108. The light from the lamp 102 enters the collimator lens 103 through the electric aperture stop 104 directly and after being reflected by the mirror 101. The collimator lens 103 outputs this incident light as parallel rays to the scattering type liquid crystal panel 105. The scattering type liquid crystal panel 105 includes a liquid crystal layer, in which a liquid crystal material is dispersed in a polymer resin, as a light-modulating layer between a pair of transparent electrode substrates. The scattering type liquid crystal panel 105 is driven by a modulating device driver (not shown) as a light-modulating device which modulates the spatial propagation direction of light by using this light-modulating layer. The modulated light from the scattering type liquid crystal panel 105 is incident on the projection lenses 107 with the electric aperture stop 108 through the field lens 106. The projection lenses 107 project the modulated light onto a reflection screen 109. That is, the basic display concept of this projection display apparatus.

The projection liquid crystal display device is known as a display device for displaying a large size image. This device collects light from a lamp onto a liquid crystal display panel and projects the transmitted light or reflected light on a screen through a projection lens to display an image in a large size.

The liquid crystal display panel can two-dimensionally modulate a light intensity, so that the transmitted light is modulated, and the modulated light is magnified and projected through an optical system to realize a projection image in a large screen size.

Thus, the liquid crystal display devices are known in various types. Most of them adopt the principle of operation represented by the previously commercialized twisted nematic liquid crystal, which principle uses the birefringence or rotatory polarization of light in a liquid crystal layer and the linear polarization of a polarizer to control the light coming out on the side of the observation face of the liquid crystal display panel, thereby displaying.

But, the liquid crystal display device using the birefringence or rotatory polarization of light in a liquid crystal layer and the line polarization of a polarizer has a disadvantage that about a half of light intensity from the light source is lost in the polarizer in view of the principle of operation. Namely, the efficiency of using the light from the light source is low because the light intensity lost in the polarizer does not contribute to displaying. As a result, there are disadvantages that the screen luminance is low, and a powerful light source is required to display at high luminance, increasing power consumption and generating heat.

On the other hand, the liquid crystal display device controlling a direction (or scattering/transmission) of outgoing light beam does not need a polarizer, improving the efficiency of using the light from the light source.

A polymer-dispersed liquid crystal display device, which is promising as the liquid crystal display device controlling a direction of outgoing light beam to display, combines a polymer synthetic resin and liquid crystal as separate phases. More specifically, combination does not dissolve one of them into the other to form one body, but disperses and holds one of them into the other. For example, a liquid crystal composition such as TN (twisted nematic) liquid crystal is dispersed and held as a liquid crystal phase in continuous or many capsule-shaped cavities in a polymer resin phase.

The above polymer-dispersed liquid crystal display device is believed to be particularly promising among the liquid crystal display devices which improve the efficiency of using the light from the light source. And, a polymer-dispersed liquid crystal layer is filled between two transparent electrodes which are disposed to face each other with a space therebetween.

In the polymer-dispersed liquid crystal display device, the polymer-dispersed liquid crystal scatters the light transmitting through it when a voltage is not applied between the two transparent electrodes. Therefore, the display is observed to be translucent white. On the other hand, when a liquid crystal drive voltage is applied between the two transparent electrodes, the polymer-dispersed liquid crystal layer becomes transparent according to the voltage applied and the light is not scattered, so that the display is observed to be highly luminance. Thus, the polymer-dispersed liquid crystal display device is a display device which controls the scattering/non-scattering of light. Combination of this display device with an optical system which extracts scattered light only or non-scattered light only can convert the control of scattered light to the control of light intensity (luminance on the display).

Based on the above operation principle, a liquid crystal display device, which does not require a polarizer, has a high efficiency of using light from a light source and can display an image with high luminance, must be realized.

Though the polymer-dispersed liquid crystal display device is expected to have the above remarkable characteristics and can display a high luminance and high definition image, only a few models have been put to use. This is because conventional production technologies are not adequate and there are various technical problems which cannot be solved easily. One of the conventional major problems is nonuniformity.

Major causes of the nonuniformity include an uneven thickness of a liquid crystal layer (or uneven liquid crystal layer thickness) in addition to variations in material properties of a liquid crystal composition.

When the liquid crystal layer thickness is not uniform in a display region, a field strength in the liquid crystal layer is variable even when a constant voltage is applied. In addition, an optical path length, which contributes to the scattering, is varied. These causes induce uneven luminance (brightness) in displayed images, which is recognized as a nonuniformity in the screen.

Now, the correlation between a direction of change in display and a variation in thickness of a liquid crystal layer will be considered. First, a conventionally used TN mode liquid crystal will be considered. The TN mode liquid crystal is operated at a certain voltage without depending on the liquid crystal layer thickness because of the properties of liquid crystal material as indicated by the expression (5.36) on page 331 of Liquid Crystal Device Handbook (No. 142 Committee of Japan Industry Association). It is obvious from the following expression seen in the above Liquid Crystal Device Handbook:

$$Vth=\pi[\{K11+(K33-2K22)/4\}/\epsilon 0.\Delta\epsilon]^{1/2}.$$

But, the polymer-dispersed liquid crystal has nematic liquid crystal dispersed in a polymer resin phase, so that a voltage is distributed between minute liquid crystal drops (generally diagrammatized as a so-called capsule liquid crystal phase or a network like liquid crystal phase) and polymer resin (generally diagrammatized as a so-called matrix polymer resin phase), resulting in that the behavior of liquid crystal molecules depends on an electric field.

The thicker the liquid crystal layer increases, the weaker the electric field strength becomes. More specifically, assuming that an electric field strength is E, a liquid crystal layer thickness is D and an applied voltage is V, the electric field strength is expressed as E=V/D. And, the electric field strength E is inversely proportional to the liquid crystal layer thickness D. Therefore, variations (dimensional variation) in the liquid crystal layer thickness cause variations in the electric field strength of the liquid crystal layer in the display region, resulting in nonuniformity in projected pictures.

A conventional liquid crystal display device disperses many spherical- or bar-shaped fine spacers made of glass or rigid plastic having a uniform diameter into a liquid crystal layer thickness of liquid crystal cells and a sealant for sealing its periphery including a case of the polymer-dispersed liquid crystal, and holds them between two opposed substrates to keep a space between the two substrates, thereby making the liquid crystal layer uniform. And, because of its operational theory, the polymer-dispersed liquid crystal display device needs to make the liquid crystal layer thicker than in an ordinary TN liquid crystal display device to increase a light scattering ability of the liquid crystal layer in order to realize a high contrast property.

However, when the liquid crystal layer is thick or the pixel size is very small, the spacers have a relatively large diameter with respect to the pixels, so that the variations in the spacer diameters and the ununiform liquid crystal layer thickness have noticeable adverse effects on a display made of pixels. Therefore, the spacers' arrangement density and position are tightly limited. As a result, a small number of spacers is required to be positioned in a limited area, making it difficult to uniformly control the thickness of the liquid crystal layer in the display surface. Namely, there is a disadvantage that the liquid crystal layer thickness does not have proper accuracy.

In the projection type liquid crystal display device, the pixel size is very small as compared with a direct-view type liquid crystal display device, the spacers are required to be dispersed in quite a low density or to be arranged while avoiding pixels. Besides, to be used for the projection type liquid crystal display device, the polymer-dispersed liquid crystal cell is required to be thick as described above, making it difficult to provide a uniform liquid crystal layer.

In the polymer-dispersed liquid crystal display device, the display condition of the liquid crystal layer are depended on the electric field as described above. In particular, the nonuniformity is noticeable when a drive voltage is high.

Thus, the conventional polymer-dispersed liquid crystal display device has a problem of producing the nonuniformity due to the variations in the thickness of the liquid crystal layer in the display region. It also has a problem that the nonuniformity becomes noticeable depending on the drive voltage.

This invention has been completed to remedy the above problems, and aims to provide a polymer-dispersed liquid crystal display device which does not suffer from the nonuniformity and realizes a uniform display in the projected image.

SUMMARY OF THE INVENTION

Generally, the nematic liquid crystal display device also produces noticeable nonuniformity in a screen when a liquid crystal layer thickness is not uniform in the display region. Therefore, it is necessary to control the thickness of a liquid crystal layer with high accuracy in order to display uniformly without nonuniformity. Namely, the thickness of the liquid crystal layer is required to be very accurate.

On the other hand, as to the technology for producing the conventional polymer-dispersed liquid crystal display device, in view of the operational theory for controlling the transmission and scattering of light, the accuracy of the thickness of the liquid crystal layer was hardly discussed in contrast to the above nematic liquid crystal display device. But, the inventors of this application have made various experiments and found that variations in the luminance (brightness) of a displayed image quite highly depend on variations in the thickness of the polymer-dispersed liquid crystal layer. Besides, as the pixel size becomes finer and the thickness rariation of layer increases, a high-precision control of the liquid crystal layer is vital to the realization of a uniform display in the projected image even for the dispersed liquid crystal display device.

Thus, in producing the dispersed liquid crystal display device according to the method of this invention, uniformity in a screen of the liquid crystal layer thickness is controlled so that a display is in a visually sufficient range in the projected image. Specifically, the uniformity in the display region between two substrates when they are joined together is controlled to be kept within the limits not resulting in nonuniformity. To make the above control, a substrate is placed on the principal surface having high smoothness of a stand, the substrate is fixed on, for example, the principal surface under suction and a stage, which can control a position with high accuracy in a direction perpendicular to the principal surface, is used to join two substrates together while keeping the uniformity in the display region of a gap (liquid crystal layer thickness) between the two substrates. At this time, the gap between the two substrates, or the uniformity in the display region of the liquid crystal layer, is controlled within the following numerical value. Specifically, variation |D−Davg| in a liquid crystal layer thickness D is set to be |D−Davg|<ΔDmax, where, $$\Delta Dmax=|Davg/(20Yavg50. V50avg)|\ or$$

$$\Delta Dmax=Davg(V90avg-V10avg)/8(V90avg+V10avg).$$

In the above expression, it is assumed as follows:

Lmax [cd/m$^2$]: maximum luminance of each picture element,

Davg [μm]: average value of liquid crystal layer thickness D,

V10avg [V]: liquid crystal applied voltage to LC having a thickness Davg for obtaining 0.1Lmax, V90avg [V]: liquid crystal applied voltage to LC having a thickness Davg for obtaining 0.9Lmax, V50avg [V]: voltage applied to liquid crystal layer having thickness Davg for obtaining 0.5Lmax, and Y50avg [/V]: rate of change (dL/Lmax dV) of luminance L to applied voltage V in liquid crystal layer with a thickness of Davg.

In view of the pixel size, it is often that the liquid crystal layer thickness is essentially not uniform.

Namely, the liquid crystal cell has the patterned transparent electrodes or thin film transistors formed on the surface of a flat substrate, and two substrates having uneven surfaces with the liquid crystal layer therebetween.

But, the display characteristics of the liquid crystal display device are effected by a particular area of the pixels, and the thickness of the liquid crystal layer at this particular area has an adverse effect.

Accordingly, the present invention defines the liquid crystal layer thickness D as follows.

Specifically, considering the liquid crystal layer in the liquid crystal cell in a display region only, the average value of the thickness of the liquid crystal layer at portions of each pixel contributing to the display is called the liquid crystal layer thickness at the pixel.

In this case, the liquid crystal layer thickness D at a point on the display region indicates a liquid crystal layer at the defined pixel arranged at the applicable point.

And, the distribution of liquid crystal layer thickness D on the display region is defined that the liquid crystal layer thickness at each of the above pixel distributed at respective pixels arranged on the display region.

The average liquid crystal layer thickness Davg is the average value of the liquid crystal layer thickness D on the liquid crystal panel.

Luminance distribution in the display region is not uniform because the luminance of liquid crystal cell L=f$_L$(V/D) depends on the liquid crystal layer thickness D and is displaced when D is not uniform in the display region even if the liquid crystal layer is formed uniformly in the characteristics and a voltage is applied equally over the whole crystal layer. Thus, the nonuniformity such as luminance unevenness is formed.

In view of the above, the variation |D−Davg| in the D is controlled to a level so that the ununiformity is not prominent. It is experimentally believed that the nonuniformity is noticeably observed when a luminance difference of ±5% or more is produced with an intermediate gradation display of L=0.5Lmax. Thus, the variations in D are controlled to suppress the variations in luminance within ±5%. To do so, the value of D is set to $$\Delta Dmax<|Davg/\{20Y50avg.V50avg\}|,\ or$$

$$\Delta Dmax<|Davg(V90avg-V10avg)/\{8(V90avg+V10avg)\}|.$$

Reasons of determining ΔDmax to be in the above range to keep |ΔL/Lmax| equal to or less than 5% with a display luminance of 0.5Lmax will be described.

To simplify the description, the electro-optical characteristic of a polymer-dispersed liquid crystal display device, or the correlation of a display luminance L and an applied voltage V, is simplified by making approximations into a straight line as shown in FIG. 10. In view of the transmission factor T=L/Lmax against the applied voltage V=ED (E: apparent electric field of the liquid crystal layer, D: liquid crystal layer thickness), the relation of T, E and D is approximated as follows:

$$T(E,D)=1;\ (E_{100}<E)$$

$$T(E,D)=\mu\ (E-E_0);\ (E_0<E<E_{100})$$

$$T(E,D)=0;\ (E<E0)$$

where, $\mu=f_\mu(T)$; function of T)=dT/dE (The d in the left expression means to partially differentiate the $f_\mu(T)$ with respect to the E. The same is applied hereinafter.)

In FIG. 10, the T is approximately treated as the straight line when $E_0 \leq E \leq E_{100}$, so that dT/dE (partial differentiation) is equal to μ(const.).

Now, halftone and $E_0<E<E_{100}$ which is most involved in displaying will be considered. Since $T(E,D)=\mu.(E-E_0)$ and the E in the above expression is equal to V/D, T(E, D) may also be expressed as follows:

$$T(V,D)=\mu.(V/D-E_0) \qquad (A)$$

A displacement of T due to a change in a certain voltage V is expressed as follows by partially differentiating the above expression (A) with respect to the D:

$$dT(V,D)/dD\ (partial\ differentiation)=-\mu.V/D^2,$$

and, a displacement ΔT of the T against the change in the V when a liquid crystal layer thickness changes by ΔD is approximately expressed as follows:

$$\Delta T/\Delta D=dT(V,D)/dD\ (partial\ differentiation),$$

resulting in $$\Delta T = \{dT(V,D)/dD\ (partial\ differentiation)\} \cdot \Delta D \qquad (B)$$
$$= \{(\mu/D^2)V\} \cdot \Delta D$$

Since a rate of change of the transmission factor T with respect to the displacement of the voltage V is expressed as Y=dT/dV=μ/D, it is incorporated in the expression (B) above as follows:

$$\Delta T=-Y.V.(\Delta D/D) \qquad (C).$$

In view of the expression (C), when the rate of change of the transmission factor T, namely steepness Y of a change in the transmission factor with respect to the voltage, is same, a range of change ΔT of the transmission factor against the rate of change (ΔD/D) of the thickness of the liquid crystal layer increases when the applied voltage increases. This relation is shown in FIG. 11.

More specifically, the applied voltage-transmission factor characteristic graph of FIG. 11 shows transmission factors A', B' and C' when each liquid crystal layer thickness (liquid crystal layer thickness) is increased by 10% in a polymer-dispersed liquid crystal display device having three electro-optical characteristics A, B and C. It is seen from FIG. 11 that changes in the transmission factor of each liquid crystal material at the applied voltage V50 are proportional to V50 regardless of the fact that A, B and C all have the same rate of change Y of the transmission factor against the applied voltage.

The inventors have made experiments to express allowable nonuniformity in numerical values on a projection type liquid crystal display device which is required to have a uniform display with high accuracy in the display region of liquid crystal cell. It is actually difficult to theoretically or mechanically evaluate the display quality of the screen in numerical values because it depends on a sensational factor of human beings such as the sense of sight. Therefore, the inventors believe that it is effective to derive the display quantity as a rule of experience based on experiments. Specifically, a difference between a portion having a maximum transmission factor and a portion having a minimum transmission factor due to variations in the transmission factor in the display region was measured with the transmission factor varied variously, and uniformity of the display in the display region at each measurement was visually evaluated by a skilled liquid crystal panel quality control engineer.

As a result, it was found that a display corresponding to a transmission factor of 50% (T=0.5) as a typical projection screen luminance was too bad to be enjoyed when a difference between the portions each having the maximum or minimum transmission factor due to variations in the transmission factor in the screen exceeded 10%.

Consequently, ΔTmax which is 10% of the T in the expression (C) when the applied voltage V is equal to V50 at the transmission factor of 50% (T=0.5) is deviations in the T at the limit where the display is too bad to be enjoyed. Since the ΔTmax at this limit is ±5%, when it is incorporated in the expression (C) to change it into an expression concerning ΔD, it is expressed as follow:

$$\Delta D = -0.05 D / Y . V50 \qquad (D),$$

and the magnitude |ΔD| of the ΔD is specified by the above expression as follows:

$$\Delta Dmax < |Davg/(20 Y50avg . V50avg)| \qquad (E).$$

The above expression (E) can be more simplified by using T=0.1 and T=0.9 without using Y50avg and V50avg when the electro-optical characteristic of the polymer-dispersed liquid crystal display device can be approximated in a straight line between T=0.1 and T=0.9 as shown in FIG. 10. Namely, it is approximately expressed as follows:

$$Yavg = (0.9 - 0.1)/(V90avg - V10avg) \qquad (F),$$

$$V50avg = (V90avg + V10avg)/2 \qquad (G),$$

then $$\Delta Dmax = |Davg . (V10avg - V90avg)/8(V90avg + V10avg)| \qquad (H).$$

Therefore, the variation ΔD in the liquid crystal layer thickness D may be made smaller than the above value.

Otherwise, since the behavior of the liquid crystal molecules of the liquid crystal layer depends on an electric field, the nonuniformity tends to occur frequently when the liquid crystal drive voltage increases. Therefore, in the above case, the variations in the liquid crystal layer thickness were controlled, but when the variations in the liquid crystal layer thickness cannot be improved better than the above case, other factors are controlled to improve the uniformity of the display in the display region.

Namely, the expression (C) can be solved with respect to the V as follows:

$$V = -D . \Delta T/(Y . \Delta D) \qquad (I).$$

When it is assumed that a feasible minimum variation in the accuracy of the liquid crystal layer is ±ΔDmin [μm] (0<ΔDmin), and a permissible range of change in the maximum transmission factor (allowable maximum range of variations in the transmission factor) is ±ΔTmax (0<ΔTmax), a maximum value of ΔT/ΔD is ΔTmax/ΔDmin, and a maximum value V50max of V50 is expressed as follows:

$$V50max = |(-Davg . \Delta Tmax)/(Y50avg . \Delta Dmin)| \qquad (J).$$

Just then, the lower limit of V50max is 0 but, it is quite difficult and actually impossible to make an error nil in the actual production. Therefore, it is to be understood that it is preferable to eliminate the variations as much as possible in the range including the above V50max as the upper limit without specifying the lower limit of the above expression. Consequently, a range of preferable values of a liquid crystal drive voltage (applied voltage) V50avg which can make the display good enough to be enjoyed is as follows:

$$0 < V50avg \leq V50max = |(Davg . \Delta Tmax)/(Y50avg . \Delta Dmin) \qquad (K).$$

Use of an optical system and a liquid crystal material for realizing an electro-optical characteristic meeting the above expression can provide a good display without prominent nonuniformity.

BRIEF DESCRIPTION OF THE DRAWINGS

FIG. 3 is a table showing the accuracy of liquid crystal layer thickness of the polymer-dispersed liquid crystal display device according to the first embodiment.

FIG. 5A is a table showing the distribution of thickness of a liquid crystal layer 13 of a liquid crystal cell of the polymer-dispersed liquid crystal display device according to the first embodiment.

FIG. 5B is a table showing the results obtained by measuring differences of the transmission factor on the periphery against the transmission factor at the center assumed to be 50% of the screen in the first embodiment.

FIG. 6 is a table showing the accuracy of liquid crystal layer thickness of a polymer-dispersed liquid crystal display device produced as a comparative example according to a conventional production method.

FIG. 7A is a table showing the results obtained by measuring differences of the transmission factor of 50% on the periphery against the transmission factor at the center assumed to be 50% of the screen of the polymer-dispersed liquid crystal display device produced as the comparative example.

FIG. 7B is a table showing the results obtained by measuring differences of the transmission factor on the periphery against the transmission factor at the center assumed to be 50% of the screen.

FIG. 8 is a table showing the results obtained by evaluating samples e–h among polymer-dispersed liquid crystal display device samples produced according to the production method of the second embodiment in terms of uniformity in accuracy of a liquid crystal layer thickness in the display region.

FIG. 9A is a table showing the distribution of thickness of a liquid crystal layer 13 of the polymer-dispersed liquid crystal display device produced according to the production method of the second embodiment.

FIG. 9B is a table showing the results obtained by measuring differences of the transmission factor of 50% at the center of the screen in the second embodiment from the transmission factor of 50% on the periphery.

DESCRIPTION OF THE PREFERRED EMBODIMENTS

Embodiment 1

Figure 1:
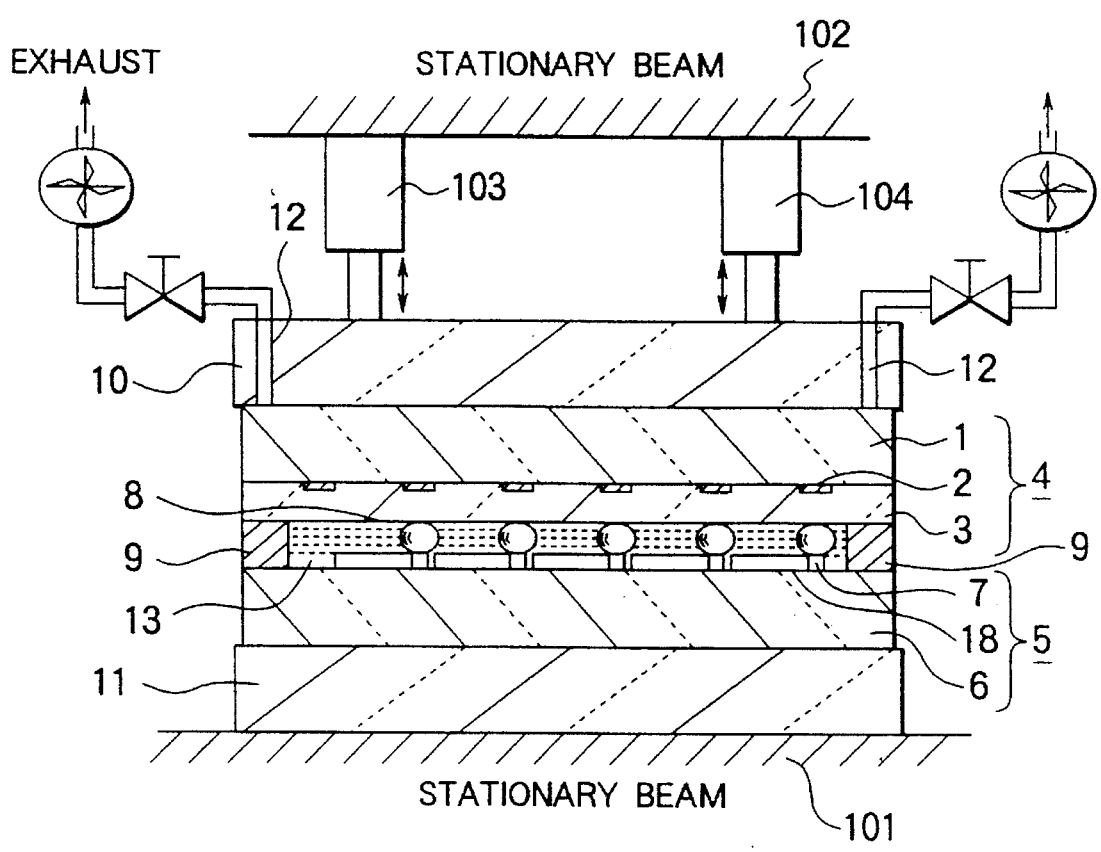
FIG. 1 is a diagram showing a method for producing the polymer-dispersed liquid crystal display device according to the invention.

The liquid crystal panel of the polymer-dispersed liquid crystal display device according to the invention was produced according to the following production method to be described with reference to FIG. 1.

A chromium film was spattered on a glass substrate 1, and pixel openings relating to displaying were opened by etching to form a black matrix 2. An ITO which was a transparent conductive film was formed thereon, and the ITO was cut into an appropriate size by scribing to form a counter electrode 3. Thus, a counter substrate 4 was produced.

On the other hand, an array substrate 5 had its main section produced by forming on a glass substrate 6 an amorphous silicon thin film transistor (hereinafter referred to as a-SiTFT) 7, signal wiring (not shown) for supplying an image signal voltage, scanning wiring (not shown) for supplying the gate of the a-SiTFT 7 with a gate voltage, and a pixel electrode 18 which was patterned by etching a transparent electrode.

Then, the liquid crystal display panel of the polymer-dispersed liquid crystal display device according to the invention was assembled and the liquid crystal layer was formed as follows.

Figure 2:
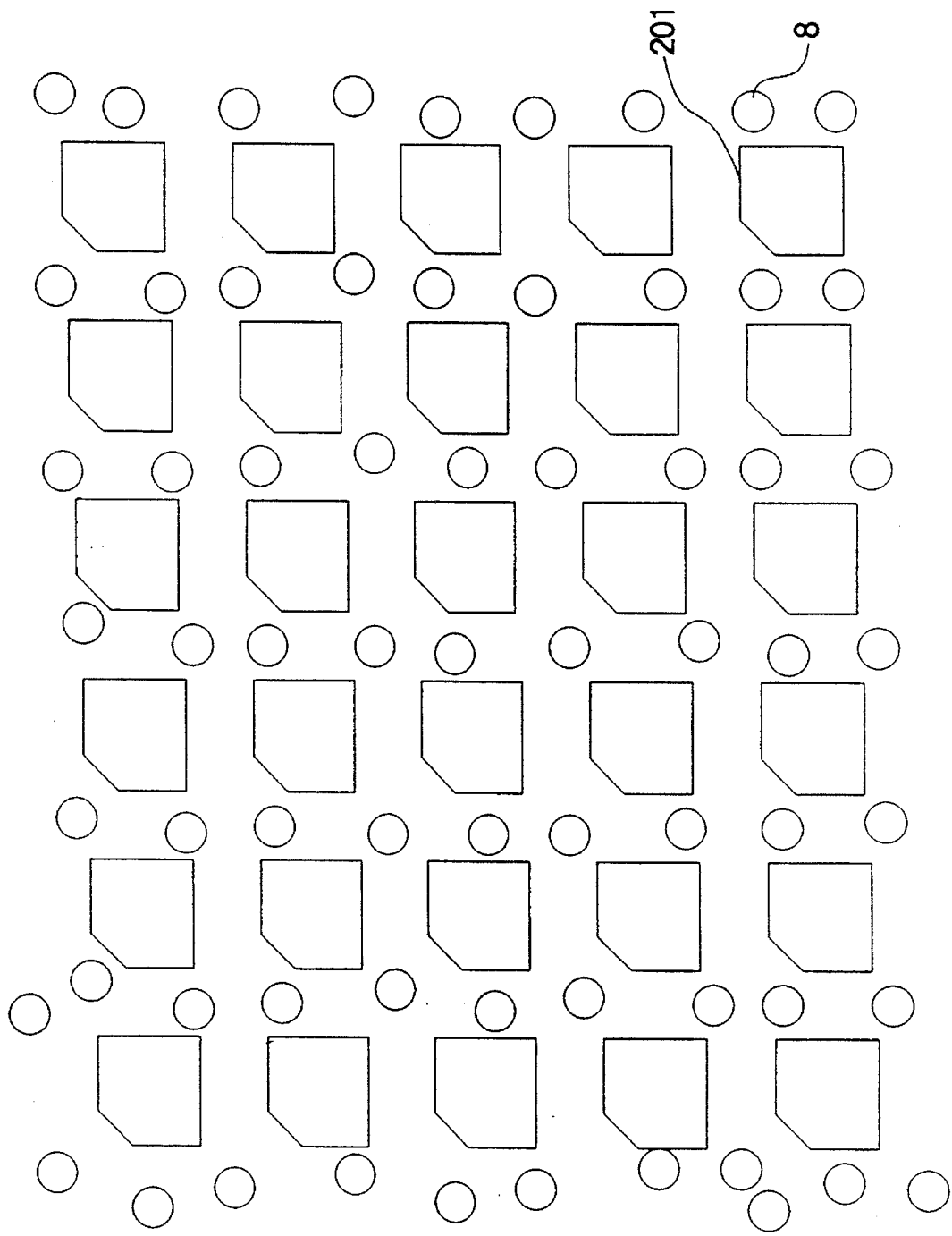
FIG. 2 is a diagram showing a plan view of the arrangement of spacers 8 of the polymer-dispersed liquid crystal display device according to the invention.

On the counter electrode 3 which is the principal surface of the counter substrate 4, spacers 8 made of divinyl benzene spheres having a diameter of 14.5 μm and a deviation of σ=0.3 μm were printed together with an epoxy-based ultraviolet-curing resin (not shown) by a flexure printing method in positions above the portions shaded by the black matrix 2 and exposed to ultraviolet rays for curing. The epoxy-based ultraviolet-curing resin was used as a sizing agent to fix the spacers 8. Thus, the spacers 8 fixed to non-pixel spots excepting the spots above the portions shaded by the black matrix 2, or pixel openings 201, hold a liquid crystal layer thickness (gap between the substrates) after completing liquid crystal cells. FIG. 2 shows the arrangement of the spacers in a plan view. These spacers 8 made of the divinyl benzene spheres have a density of about 150 spacers/mm$^2$ in this embodiment.

Then, an adhesive sealer 9 was formed by a screen printing method along the periphery of a display section of the array substrate 5 excepting a injection hole (not shown) of 3 mm wide for injecting liquid crystal. This adhesive sealer 9 used contained 4 wt % of glass fiber having a diameter of 14 μm and a deviation of σ=0.2 μm mixed into a thermosetting epoxy-based adhesive agent.

And, a substrate joining machine, which was produced by the inventors, was used. This machine positions the two substrates 4, 5 on its principal surfaces, respectively, can naturally make the position control on a flat surface and also can make the correct position control in a normal direction with respect to the principal surfaces, and is provided with stages 10, 11 whose principal surfaces, on which the two substrates are positioned respectively, are mirror-finished and have quite smooth surfaces. The substrates 4, 5 were fixed on the principal surfaces of the stages 10, 11 under suction by suction holes 12 which were formed in the principal surfaces through the stages 10, 11. To the substrates 4, 5 positioned to oppose to each other, a pressure was applied to provide a space of about 20 μm between the substrates 4, 5. Then, with the pressure kept applied, heat was applied up to 200 degrees C. to cure the adhesive sealer 9 composed of a thermosetting epoxy resin while further decreasing the space, i.e., a liquid crystal layer thickness, between the substrates 4, 5. Thus, a liquid crystal display panel with the cell empty was produced. Through the above process, the positions of the stages 10, 11 in the normal direction were controlled so that the accuracy of a liquid crystal layer thickness fell within ±0.15 μm. At this time, the central value of the liquid crystal layer thickness was set to 14 μm.

To control the positional accuracy of the stages 10, 11 in the normal direction, a stage position control device, which can control the position of the principal surface in the normal direction with high precision of submicrons, is preferably used. For the stages 10, 11, a plate stage made of a material which is, for example, mirror-finished and smooth-surfaced and is not largely warped under pressure can be preferably used so that the flatness of the principal surface on which the substrate is positioned has accuracy higher than that (±0.15 μm in this embodiment) of the liquid crystal layer thickness (liquid crystal layer). Specific examples include thick quartz glass whose surface has been polished. And, when the polymer resin phase of a liquid crystal layer 13 is an ultraviolet-curing resin, at least one of the stages 10, 11 is preferably transparent plates made of a material good in allowing ultraviolet rays to pass through. This is to inject a liquid material for forming the liquid crystal layer into the liquid crystal layer thickness while keeping the liquid crystal layer thickness with high precision as described above and to effectively irradiate the forming liquid material with ultraviolet rays, thereby enabling to cure the polymer resin phase. Besides, when the transparent plates are used, to control the positional accuracy of the stages 10, 11 in the normal direction, unevenness of the liquid crystal layer thickness can be detected by, for example, observing interference fringes formed by the radiated light of low pressure sodium (Na) lamp. Specifically, among the light radiated from above the stage 10, the light reflected on the interface between the counter electrode 3 and the liquid crystal layer 13 interferes with the light reflected on the interface between the liquid crystal layer 13 and the pixel electrode 8, so that unevenness of the thickness of the liquid crystal layer on the display is observed as interference fringes. If a plane distribution of the interference fringes was found unbalanced, the unbalanced part indicates a portion where the liquid crystal layer thickness is not uniform. Therefore, that portion of the liquid crystal layer thickness is controlled to make the liquid crystal layer thickness uniform. To do so, arms 103, 104 which are suspended from a stationary beam 103 to control the stage 10 can be controlled to adjust the portion of the liquid crystal layer thickness which was observed having the ununiform interference fringes. The liquid crystal layer thickness can be accurately controlled by adjusting the position of the stage 10 while observing the interference fringes. In this sense too, the transparent substrate such as quartz glass named above is preferable. When the transparent plate having high hardness such as the above quartz glass substrate is used for the stages 10, 11, the suction holes 12 may not be drilled easily. In such a case, the suction of the substrates 4, 5 to the stages 10, 11 may be made by applying, for example, an oil or fat having high viscosity between the principal surfaces of the stages 10, 11 and those of the substrates 4, 5 to join them by the surface tension of the oil or fat. Otherwise, a highly heat-resistant resin plate which is highly transparent and easily drilled, and has the surface smoothed may be used.

If the stage 10 does not provide a uniform liquid crystal layer thickness by applying the uniform pressure to the entire liquid crystal display panel, a control mechanism may be disposed at a plurality of positions on the stage surface to control the position in a normal direction with respect to the principal surface of the stage so that a high pressure can be applied to a thick portion of the liquid crystal layer. Controlling the pressure of each control mechanism at the plurality of positions to apply the high pressure to the thick portion of the liquid crystal layer can provide a uniform liquid crystal layer thickness for the entire liquid crystal display panel.

Then, a mixed liquid of nematic liquid crystal and acrylic oligomer was used as a material for the liquid crystal layer 13, a vacuum chamber was evacuated to the near vacuum, and the air in the liquid crystal display panel with the cell empty was discharged. After fully discharging the air from the liquid crystal display panel, the injection hole of the liquid crystal display panel was dipped in the liquid material, to let the liquid material into the vacuum cell. The liquid material for the liquid crystal layer 13 may be injected under pressure through the injection hole of the liquid crystal display panel.

After completely injecting the liquid material for the liquid crystal layer 13 into the liquid crystal display panel, the liquid crystal display panel was held by the substrate joining machine provided with the stages 10, 11 made of quartz glass, the arms 103, 103 were controlled to adjust the pressure distribution to have the least interference infringes while observing the interference infringes which were formed by the light from a low pressure sodium lamp, and the liquid material was cured by radiating from an ultraviolet lamp to produce the polymer-dispersed liquid crystal layer 13.

Thus, the polymer-dispersed liquid crystal display device of the first embodiment produced with the liquid crystal layer thickness controlled according to the production method of the invention has the liquid crystal layer thickness accuracy as shown in FIG. 3. It is apparent from FIG. 3 that the liquid crystal layers produced have a thickness of very high accuracy of ±0.1 μm excepting sample d.

The liquid crystal display devices produced in the first embodiment were mounted on the optical system of a projection type display device, and uniformity of the projected images on the screen was evaluated.

Figure 4:
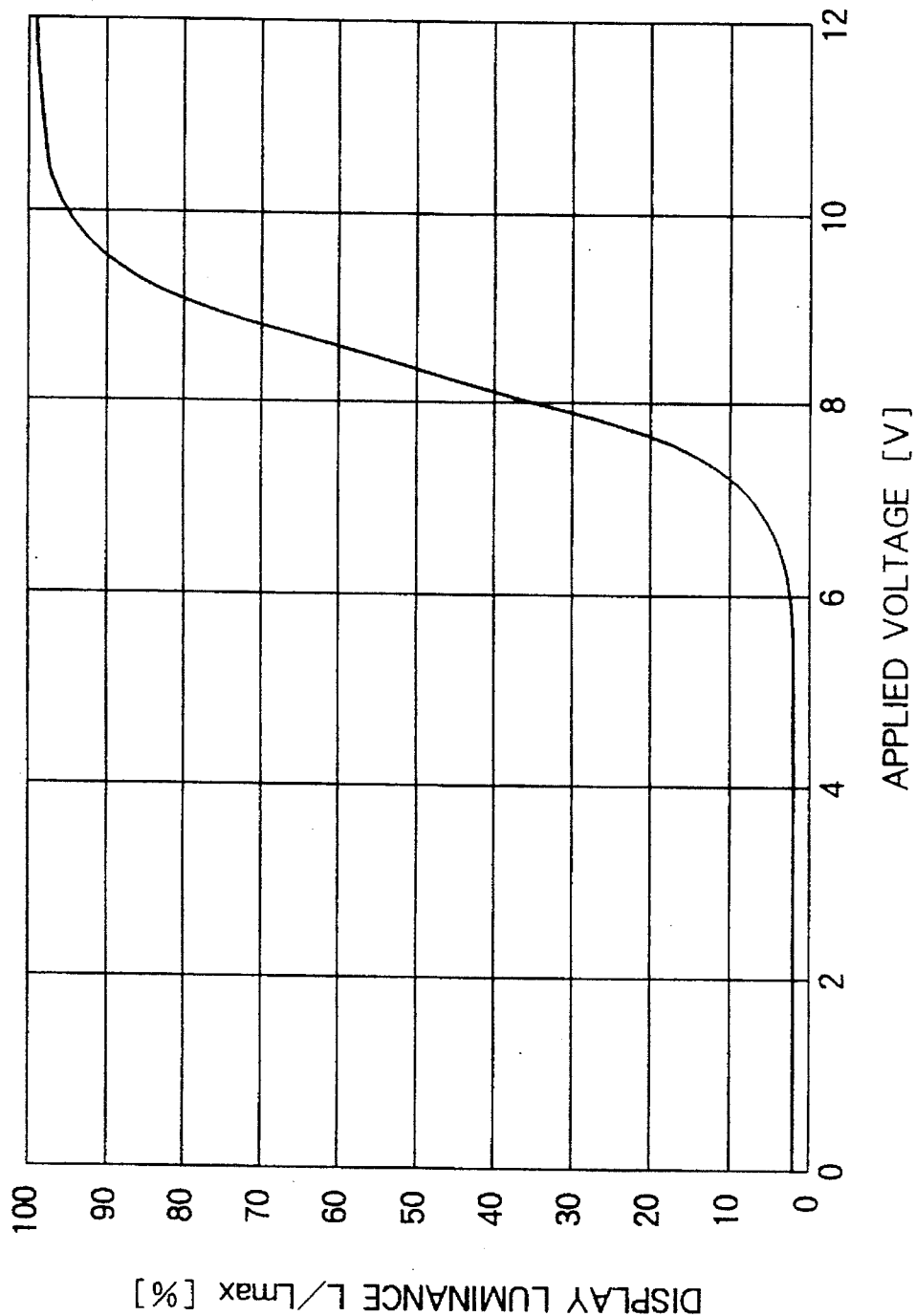
FIG. 4 is a graph showing the applied voltage-transmission factor characteristic at the center of a screen of a projection type display device produced using the polymer-dispersed liquid crystal display device according to the first embodiment.
Figure 10:
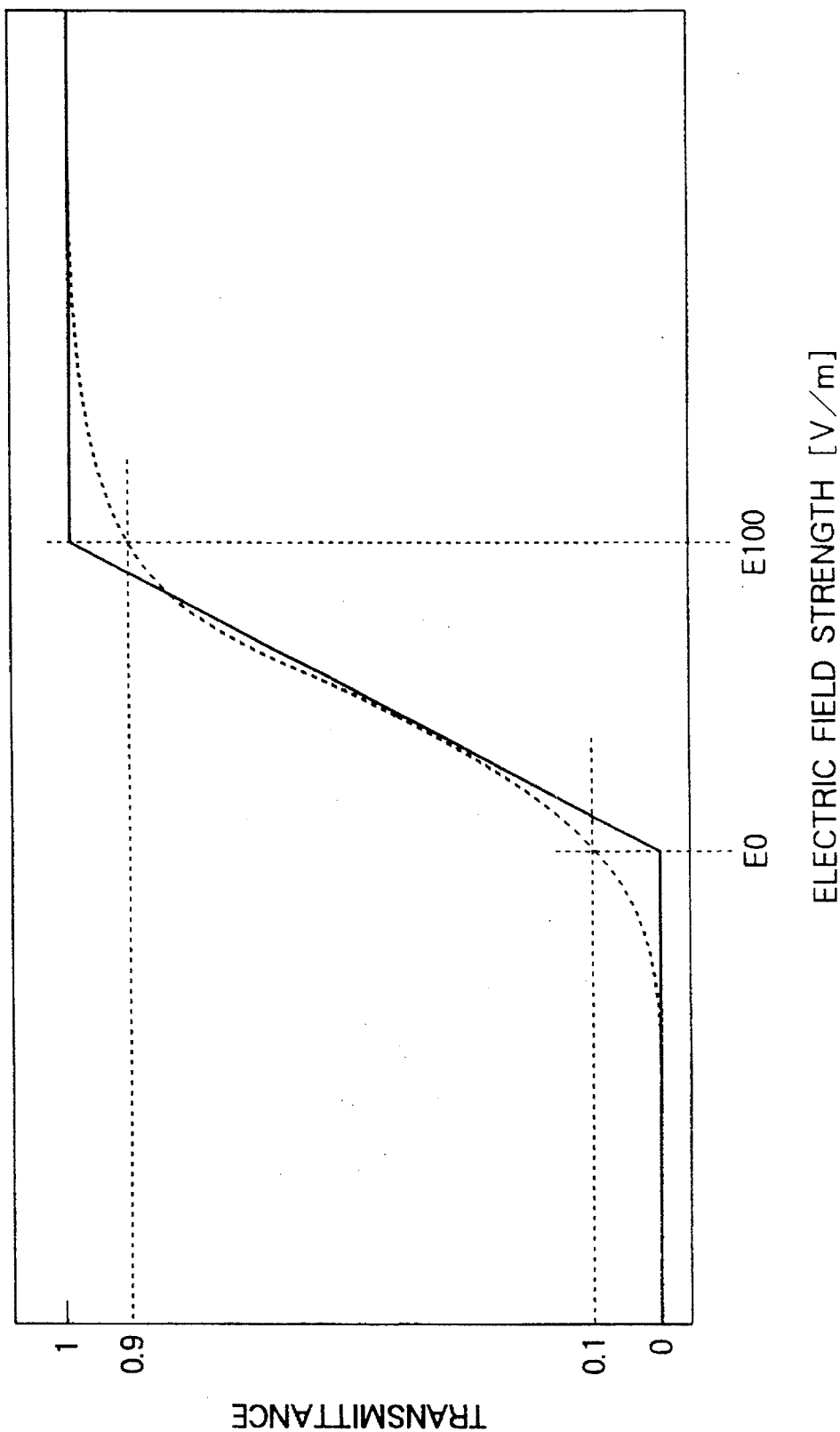
FIG. 10 is a graph showing the electro-optical characteristic of a conventional polymer-dispersed liquid crystal display device, approximated into a straight line to simplify the description.
Figure 11:
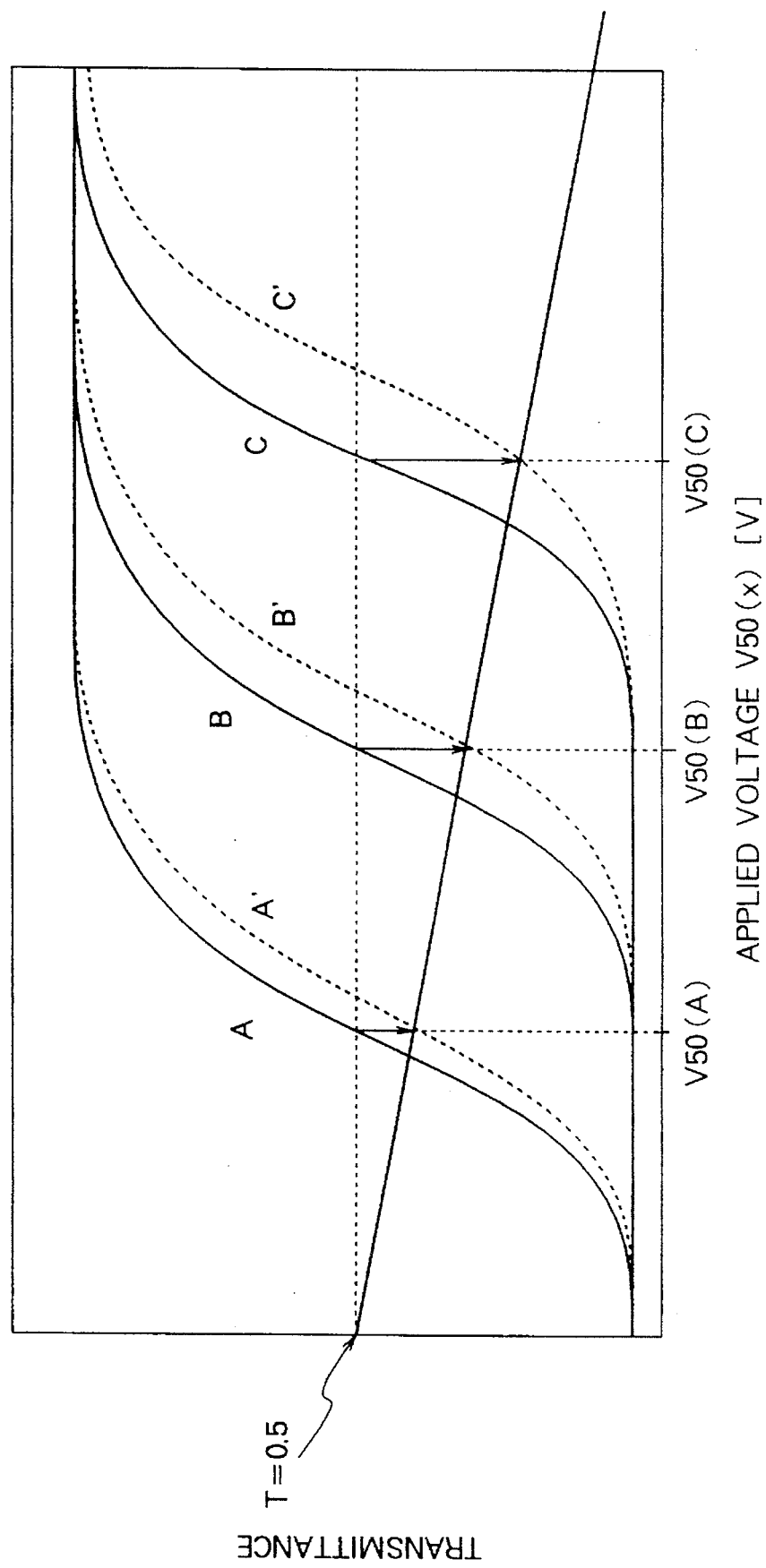
FIG. 11 is a graph showing that when the rate of change of the transmission factor T, namely steepness Y of a change in the transmission factor with respect to a voltage, is same, a range of change ΔT of the transmission factor against the rate of change (ΔD/D) of the thickness of the liquid crystal layer increases when the applied voltage increases.

Details of the projection type display device are omitted because it operates in the same way as conventional projection type display devices. The applied voltage-transmission factor characteristic at the center of the screen of this projection type display device is as shown in FIG. 4. It is seen from the characteristic that the thickness of the liquid crystal layer 13 is required to have accuracy of ±0.15 μm in view of the conditions of the invention.

FIG. 5A shows the thickness distribution of the liquid crystal layer 13 of the liquid crystal cell mounted on the polymer-dispersed liquid crystal display device at nine spots one each in nine areas on one screen. And, assuming that the transmission factor at the center of the projected image is 50%, the results obtained by measuring differences of transmission factors on the periphery of the projected image from the transmission factor of 50% are shown in FIG. 5B.

It is seen from FIG. 5 that variations in the thickness of the liquid crystal layer 13 of this liquid crystal display panel are within ±0.1 μm. And, changes in the transmission factor are within 3.4%, and when skilled display quality inspection personnel inspected the display screen, ununiformity was hardly conspicuous.

To compare with this invention, samples of a conventional polymer-dispersed liquid crystal display device were produced with the spacers dispersed according to a more common dry dispersion method. These samples are same in the structure of a liquid crystal display panel, a liquid crystal material and an average thickness of the liquid crystal layer as those described above, but different in the production method, particularly the method for controlling the thickness of the liquid crystal layer.

First, the adhesive sealer 9 was printed on the periphery of display section of the counter substrate 4 by a screen printing method excluding a 3-mm injection hole for injecting liquid crystal. This adhesive sealer 9 used contained 4 wt % of glass fiber having a diameter of 14 μm and a deviation of σ=0.2 μm mixed into a thermosetting epoxy-based adhesive agent. Then, as the spacers 8, powder of divinyl benzene spheres having a diameter of 14.5 μm and a deviation of σ=0.3 μm was sprayed by injecting with compressed nitrogen gas onto the counter substrate 4 so as to be naturally adsorbed onto the surface of the counter substrate 4 to oppose the array substrate 5, a space between the substrates 4, 5 was decreased to about 20 μm by means of a press used in a conventional ordinary production process, and heat was applied to cure the sealer while further decreasing the space between the substrates, i.e., a liquid crystal layer thickness, to produce an empty cell. The spacers had a density of about 30 spacers/mm². Then, a liquid material for the liquid crystal layer was charged into the cell in the same way as the production process of the first embodiment of the invention, a pressure was applied to a liquid crystal display panel having the liquid crystal material between transparent stages by means of a common press used in producing conventional liquid crystal display devices, and the liquid crystal material was irradiated with ultraviolet rays from an ultraviolet lamp to cure a polymer-dispersed liquid crystal.

The polymer-dispersed liquid crystal display devices produced according to the above process have the liquid crystal layer thickness precision as shown in FIG. 6. Among the samples shown in FIG. 6, sample No. e was mounted on the optical system of a projection type display device to evaluate the uniformity of display. Assuming that a transmission factor at the center of the projected image is 50%, the results obtained by measuring differences of transmission factors on the periphery of the projected image from the transmission factor of 50% are shown in FIG. 7A. And, with the liquid crystal panel of the polymer-dispersed liquid crystal display device, a variation in the thickness of the liquid crystal layer is about ±0.3 μm and the change in the transmission factor was expanded to 15% as shown in FIG. 7B. Observation of the displayed screen found that the nonuniformity was prominent on the projected image and the display quality was noticeably deteriorated.

Embodiment 2

In the second embodiment, spacers having a diameter of 7 μm were dispersed according to the dry dispersion method to produce a polymer-dispersed liquid crystal display device. In the following description, the same members as used in the first embodiment will be given the same reference numerals.

First, an adhesive sealer 9 was printed by a screen printing method along the periphery of a display section of a counter substrate 4 excepting a injection hole of 3 mm wide for injecting a liquid material for a liquid crystal layer 13. The adhesive sealer 9 used contained 1 wt % of glass fiber having a diameter of 6.8 μm (different from the one used in the first embodiment) and a deviation of σ=0.2 μm mixed into a thermosetting epoxy-based adhesive agent.

Then, differing from the spacers 8 having a diameter of 14.5 μm and a deviation of σ=0.3 μm used in the first embodiment, powder of divinyl benzene spheres having a diameter of 7.0 μm and a deviation of σ=0.2 μm was sprayed by injecting with compressed nitrogen gas onto the principal surface of the counter substrate 4 so as to be naturally adsorbed thereon. The counter substrate 4 was joined to an array substrate 5, these substrates were pressed by applying a pressure by means of a substrate joining machine provided with stages 10, 11 in the same way as in the first embodiment to provide a space of about 15 μm between these substrates, and heat was applied to cure the adhesive sealer 9 while further reducing the liquid crystal layer thickness, thereby producing a liquid crystal display panel with a cell empty. The spacers had a density of about 60 spacers/mm². Differing from the first embodiment, this embodiment used the spacers having a smaller diameter and it was evident that the relative size of the spacers on the pixel section had substantially no adverse effect on the display, so that the spacers were also sprayed on the pixel section.

After charging a liquid material for the liquid crystal layer 13 into the empty cell in the same way as in the first embodiment, ultraviolet rays from an ultraviolet lamp were irradiated while applying a pressure to the liquid crystal machine provided with the quartz glass stages 10, 11 to cure display panel by means of the aforementioned substrate joining the liquid material, thereby producing the liquid crystal layer 13. At this time, the position in a normal direction with respect to the principal surfaces of the stages 10, 11 was controlled with accuracy lower than in the first embodiment, so that variations (to be described afterward) in the thickness (liquid crystal layer thickness) of the liquid crystal layer became larger than in the first embodiment.

In this embodiment, the main constituent materials of the liquid crystal layer 13 were almost the same as used in the first embodiment. However, nematic liquid crystal occupied a large part of the liquid crystal layer and the liquid crystal layer 13 had a thickness considerably different from the one used in the first embodiment and, therefore, its properties were also different. Specifically, the liquid crystal layer 13 was made thin to lower a liquid crystal drive voltage. A curing condition of the polymer phase of the liquid crystal layer 13 with ultraviolet rays was changed by reducing the energy of irradiated ultraviolet rays to reduce the changes in the transmission factor of the liquid crystal layer 13 with respect to the applied voltage.

Figure 12:
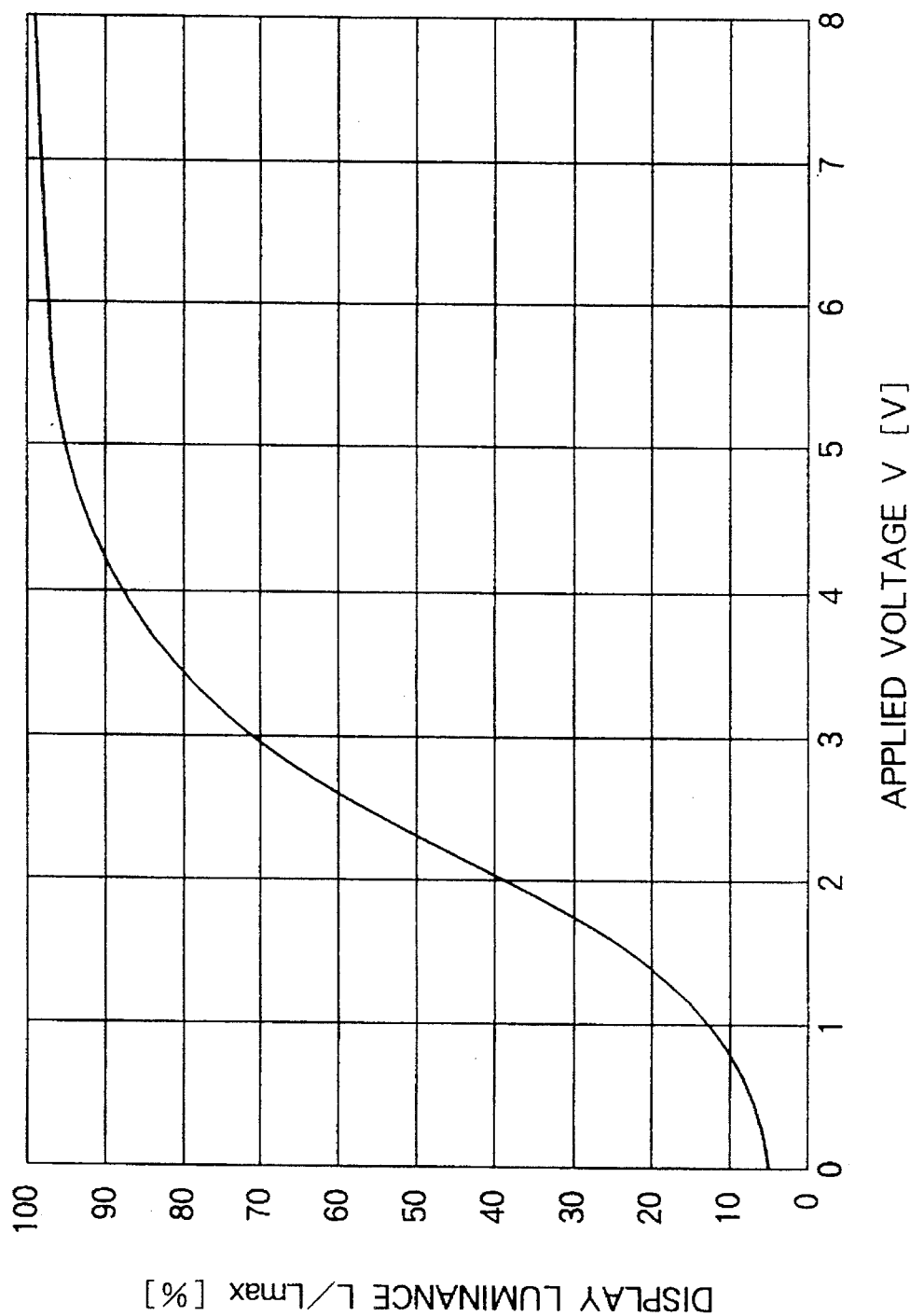
FIG. 12 is a graph showing the applied voltage-transmission factor characteristic at the center of a screen of a projection type display device produced using the polymer-dispersed liquid crystal display device according to the second embodiment.
Figure 13:
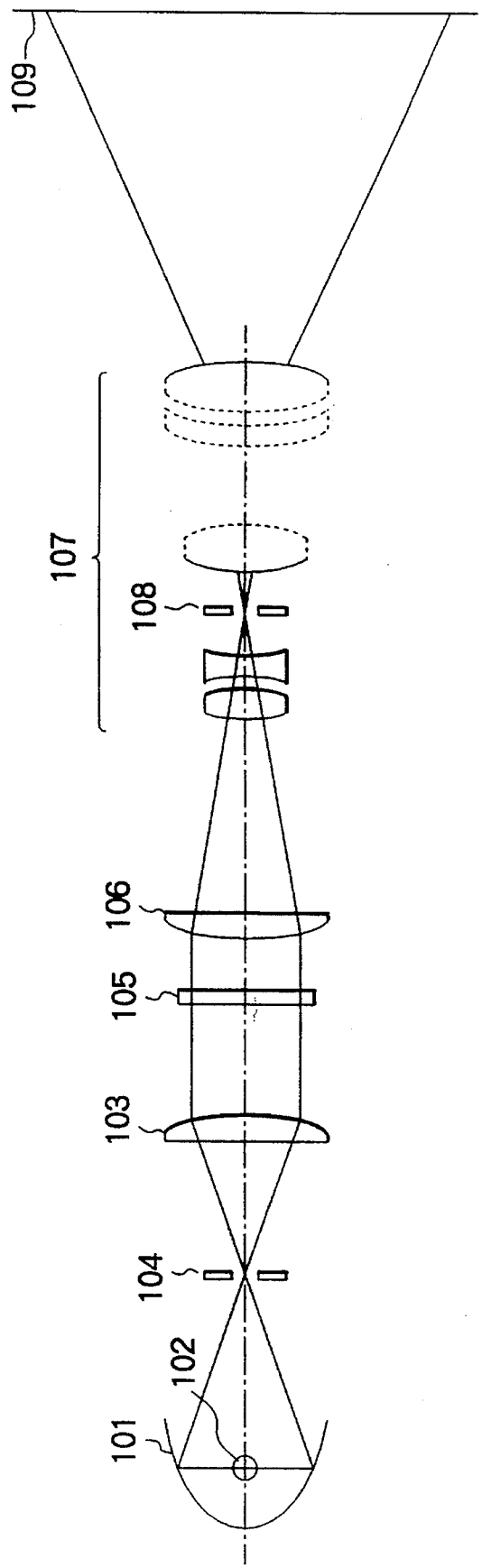
FIG. 13 is a schematic diagram showing the structure of conventional projection type display device.

The applied voltage-transmission factor characteristic of the liquid crystal display device of the second embodiment is as shown in FIG. 12.

FIG. 9A shows the variations in thickness of the liquid crystal layer. In the second embodiment, the liquid crystal layer has considerably larger variations in the thickness of the liquid crystal layer than in the first embodiment. But, the variations in the display region are sufficiently small in a projection liquid crystal display device using this liquid crystal panel.

The reasons for that are as follows. When the ratio of a luminance L on the display screen and a maximum value Lmax is assumed to be a transmission T=L/Lmax, a liquid crystal applied voltage for realizing T=0.5 is V50avg, a rate Y of change of the transmission T against the liquid crystal layer applied voltage when a voltage close to V50avg is applied is Y50avg and an allowable value of the variations in the screen of the transmission T on the display screen is ΔT, then the relation of the Davg, ΔDmax and Y50avg against ΔT=0.05 is set to meet the following expression:

$$0 < V50avg < |(Davg \cdot \Delta T)/(\Delta Dmax \cdot Y50avg)|.$$

This embodiment can fill the above condition by determining ΔDmax to be 0.4 μm.

Among the samples prepared as above and listed in FIG. 8, sample i was mounted in the optical system of a projection type display device, and the uniformity of display in the projected image screen was evaluated.

FIG. 9A shows the distribution of thickness of the liquid crystal layer 13 of the polymer-dispersed liquid crystal display device mounted as described above. And, assuming that a transmission factor at the center of the projected image is 50%, the results obtained by measuring differences of transmission factors on the periphery of the projected image from the transmission factor of 50% are shown in FIG. 9B.

As obvious from FIG. 9A and FIG. 9B, with the polymer-dispersed liquid crystal display device of the second embodiment, variations in the thickness of the liquid crystal layer 13 have an accuracy of about ±0.3 μm but the change in the transmission factor is within 5%, meeting the above expression. When a skilled liquid crystal panel quality control engineer inspected the display image, it was found that ununiformity was hardly conspicuous. It was confirmed that even when the liquid crystal layer thickness had the variations as described above, the display characteristic, i.e., the variations in the display image, could be controlled low by setting the liquid crystal drive voltage as described above.

As described above, this invention can produce a polymer-dispersed liquid crystal display device which can display images of high quality without ununiformity. The characteristics of the polymer-dispersed liquid crystal required can be freely set in view of the accuracy of the liquid crystal layer thickness (liquid crystal layer thickness), so that the design and display quality can be easily controlled. Besides, the production cost can be reduced.

In terms of improving accuracy of liquid crystal layer thickness, it must be effective to form a insulating layer and to grind the surface of it, before forming the pixel electrode on it. Or, it is also effective to use a insulating layer made of resin as the ground insulating layer.

What is claimed is:

1. A method for producing a polymer-dispersed liquid crystal display device comprising a first substrate having a first electrode formed on a first plate, a second substrate having a second electrode formed on a second plate, and a polymer-dispersed liquid crystal layer held in a space between said first and second substrates, wherein, when it is assumed that the average value of said polymer-dispersed liquid crystal layer thickness D in the display area of said polymer-dispersed liquid crystal display device is Davg, the maximum value of said polymer-dispersed liquid crystal layer thickness D at a variation |D−Davg| in said display area is ΔDmax, the average value of said polymer-dispersed liquid crystal layer thickness is Davg, and brightness of the brightest display in said display area is determined to be a transmission factor 1 under the above definition, then a liquid crystal drive voltage for achieving a transmission factor 0.5 in said display area is V50avg and the sharpness of a change in the transmission factor with respect to a voltage change at said V50avg is Y50avg, characterized in that said method comprises:

a step for holding a liquid material for said polymer-dispersed liquid crystal layer between said first and second substrates, and a step for supporting at least one of said first and second substrates by a supporting plate capable of controlling in a normal direction with respect to a principal surface of at least one of said first and second substrates; and a step for curing the liquid material for said polymer-dispersed liquid crystal layer held in the space between said substrates while controlling said supporting plate in a normal direction with respect to the principal surface of said one substrate so that said ΔDmax falls in a range of 0<ΔDmax<|Davg/20.Y50avg.V50avg| to form said polymer-dispersed liquid crystal layer.

2. A method for producing a polymer-dispersed liquid crystal display device according to claim 1, wherein at least one of said first and second plates is a transparent plate, further comprising:

a step for irradiating light from the side of said transparent plate to detect a thickness of the space between said first substrate and said second substrate based on a plane distribution of interference fringes of said light and a density of the interference fringes of said light, and the step for curing said liquid material for said polymer-dispersed liquid crystal layer held in the space between said substrates while controlling said supporting plate in a normal direction with respect to the principal surface of said one substrate is based on said detected space thickness.

3. A method for producing a polymer-dispersed liquid crystal display device comprising a first substrate having a first electrode formed on a first plate, a second substrate having a second electrode formed on a second plate, and a polymer-dispersed liquid crystal layer held in a space between said first and second substrates, wherein, when it is assumed that the average value of said polymer-dispersed liquid crystal layer thickness D in the display area of said polymer-dispersed liquid crystal display device is Davg, the maximum value of said polymer-dispersed liquid crystal layer thickness D at a variation |D−Davg| in said display area is ΔDmax, the average value of said polymer-dispersed liquid crystal layer thickness is Davg, and brightness of the brightest display in said display area is determined to be a transmission factor 1 under the above definitions, then a liquid crystal drive voltage for achieving a transmission factor 0.9 in said display area is V90avg, and for achieving a transmission factor of 0.1 in said display area is V10avg, characterized in that said method comprises:

a step for holding a liquid material for said polymer-dispersed liquid crystal layer between said first and second substrates, and a step for supporting at least one of said first and second substrates by a supporting plate capable of controlling in a normal direction with respect to a principal surface of at least one of said first and second substrates; and a step for curing the liquid material for said polymer-dispersed liquid crystal layer held in the space between said substrates while controlling said supporting plate in a normal direction with respect to the principal surface of said one substrate so that said ΔDmax falls in a range of 0<ΔDmax<|Davg.(V90avg−V10avg)/8(V90avg+Vavg) to form said polymer-dispersed liquid crystal layer.

4. A method for producing a polymer-dispersed liquid crystal display device according to claim 3, wherein at least one of said first and second plates is a transparent plate, further comprising:

a step for irradiating light from the side of said transparent plate to detect a thickness of the space between said first substrate and said second substrate based on a plane distribution of interference fringes of said light and a density of the interference fringes of said light, and the step for curing said liquid material for said polymer-dispersed liquid crystal layer held in the space between said substrates while controlling said supporting plate in a normal direction with respect to the principal surface of said one substrate is based on said detected space thickness.

5. A method for producing a polymer-dispersed liquid crystal display device comprising a first substrate having a first electrode formed on a first plate, a second substrate having a second electrode formed on a second plate, and a polymer-dispersed liquid crystal layer held in a space between said first and second substrates, wherein, when it is assumed that the average value of said polymer-dispersed liquid crystal layer thickness D in the display area of said polymer-dispersed liquid crystal display device is Davg, the maximum thickness of said polymer-dispersed liquid crystal layer in said display area is Dmax, the minimum thickness of said polymer-dispersed liquid crystal layer in said display area is Dmin, a dispersion range Dmax–Dmin in said display area of the thickness D of said polymer-dispersed liquid crystal layer is $\Delta$Dmin, the average value of said polymer-dispersed liquid crystal layer thickness is Davg, and brightness of the brightest display in said display area is determined to be a transmission factor 1 under the above definitions, then a liquid crystal drive voltage for achieving a transmission factor 0.5 in said display area is V50avg, and the sharpness of a change in the transmission factor with respect to a voltage change at said V50avg is Y50avg, characterized in that said method comprises:

a step for supporting at least one of said first and second substrates by a supporting plate capable of controlling in a normal direction a principal surface of said one substrate; and a step for curing the liquid material for said polymer-dispersed liquid crystal layer held in the space between said substrates while controlling said supporting plate in a normal direction with respect to the principal surface of said one substrate, and controlling at least one of said Davg, said V50avg, said $\Delta$Dmin and said Y50avg so as to meet the relation of 0<V50avg<|Davg/(10.$\Delta$Dmin.Y50avg)|.

6. A method for producing a polymer-dispersed liquid crystal display device according to claim 5, wherein at least one of said first and second plates is a transparent plate, further comprising:

a step for irradiating light from the side of said transparent plate to detect a thickness of the space between said first and second substrates based on a plane distribution of interference fringes of said light and a density of the interference fringes of said light, and the step for curing said liquid material for said polymer-dispersed liquid crystal layer held in the space between said substrates while controlling said supporting plate in a normal direction with respect to the principal surface of said one substrate is based on said detected space thickness.

7. A polymer-dispersed liquid crystal display device comprising a first substrate having a first electrode formed on a first plate, a second substrate having a second electrode formed on a second plate, and a polymer-dispersed liquid crystal layer held in the space between said first and second substrates, characterized in that when it is assumed that the average value of said polymer-dispersed liquid crystal layer thickness D in the display area of said polymer-dispersed liquid crystal display device is Davg, the maximum value of said polymer-dispersed liquid crystal layer D is $\Delta$Dmax at a variation |D–Davg| in said display area, the average value of said polymer-dispersed liquid crystal layer thickness is Davg, brightness of the brightest display in said display area is a transmission factor of 1 under the above definitions, then when a liquid crystal drive voltage for achieving a transmission factor of 0.5 in said display area is V50avg, and the sharpness of a change in the transmission factor with respect to a voltage change at said V50avg is Y50avg; said space is controlled so that said $\Delta$Dmax falls in a range of 0<$\Delta$Dmax<|Davg/20.Y50avg.V50avg|.

8. A polymer-dispersed liquid crystal display device comprising a first substrate having a first electrode formed on a first plate, a second substrate having a second electrode formed on a second plate, and a polymer-dispersed liquid crystal layer held in the space between said first and second substrates, characterized in that when it is assumed that the average value of said polymer-dispersed liquid crystal layer thickness D in the display area of said polymer-dispersed liquid crystal display device is Davg, the maximum value of said polymer-dispersed liquid crystal layer thickness D at a variation |D–Davg| in said display area is $\Delta$Dmax, the average value of said polymer-dispersed liquid crystal layer thickness is Davg, brightness of the brightest display in said display area is a transmission factor of 1 under the above definitions, then when a liquid crystal drive voltage for achieving a transmission factor of 0.9 in said display area is V90avg, and achieving a transmission factor of 0.1 in said display area is V10avg; said space is controlled so that said $\Delta$Dmax falls in a range of 0<$\Delta$Dmax<|Davg.(V90avg–V10avg)/8(V90avg+V10avg)|.

9. A polymer-dispersed liquid crystal display device comprising a first substrate having a first electrode formed on a first plate, a second substrate having a second electrode formed on a second plate, and a polymer-dispersed liquid crystal layer held in the space between said first and second substrates, wherein when the average value of said polymer-dispersed liquid crystal layer thickness D in the display area of said polymer-dispersed liquid crystal display device is Davg, the maximum thickness of said polymer-dispersed liquid crystal layer in said display area is Dmax, the minimum thickness of said polymer-dispersed liquid crystal layer in said display area is Dmin; a dispersion range Dmax–Dmin in said display area of the thickness D of said polymer-dispersed liquid crystal layer is $\Delta$Dmin, the average value of said polymer-dispersed liquid crystal layer thickness is Davg, and brightness of the brightest display in said display area is determined to be a transmission factor of 1 under the above definitions, then a liquid crystal drive voltage for achieving a transmission factor of 0.5 in said display area is V50avg, and the sharpness of a change in the transmission factor with respect to a voltage change at said V50avg is Y50avg, at least one of said Davg, said V50avg, said $\Delta$Dmin and said Y50avg is controlled so as to meet the relation of 0<V50avg<|Davg/(10.$\Delta$Dmin.Y50avg)|.

* * * * *

UNITED STATES PATENT AND TRADEMARK OFFICE
CERTIFICATE OF CORRECTION

PATENT NO. : 5,617,228
DATED : April 01, 1997
INVENTOR(S) : Yoshihiro WATANABE et al.

It is certified that error appears in the above-indentified patent and that said Letters Patent is hereby corrected as shown below:

Claim 1, column 15, line 56, "20.Y50avg.V50avg" should read --20·Y50avg·V50avg--.

Claim 3, column 16, lines 18-19, delete "the average value of said polymer-dispersed liquid crystal layer thickness is Davg,".

Claim 3, column 16, line 39, "Davg.(V90avg VI0avg)" should read --Davg·(V90avg-V10avg)--.

Claim 5, column 17, lines 5-6, delete "the average value of said polymer-dispersed liquid crystal layer thickness is Davg,".

Claim 5, column 17, line 25, "(10.▲Dmin.Y50avg)" should read --(10·▲Dmin·Y50avg)--.

Claim 7, column 18, line 7, "20.Y50avg.V50avg" should read --20·Y50avg·V50avg--.

Claim 8, column 18, line 25, before "achieving", insert --for--.

UNITED STATES PATENT AND TRADEMARK OFFICE
CERTIFICATE OF CORRECTION

PATENT NO. : 5,617,228
DATED : April 01, 1997
INVENTOR(S) : Yoshihiro WATANABE et al.

It is certified that error appears in the above-indentified patent and that said Letters Patent is hereby corrected as shown below:

Claim 8, column 18, lines 27-28, "Davg.(V90avg-V10avg)" should read --Davg·(V90avg-V10avg)--.

Claim 9, column 18, line 52, "(10.▲Dmin.Y50avg)" should read --(10·▲Dmin·Y50avg)--.

Signed and Sealed this

Fourteenth Day of April, 1998

*Attest:*

BRUCE LEHMAN

*Attesting Officer*     *Commissioner of Patents and Trademarks*